United States Patent [19]
Walch et al.

[11] 3,952,276
[45] Apr. 20, 1976

[54] FLUID TIGHT NTC HIGH TEMPERATURE SENSOR AND METHOD OF PRODUCING SAME

[75] Inventors: Horst Walch; Urlich Walter, both of Munich, Germany

[73] Assignee: Siemens Aktiengesellschaft, Berlin & Munich, Germany

[22] Filed: Feb. 6, 1975

[21] Appl. No.: 547,594

[30] Foreign Application Priority Data
Feb. 21, 1974 Germany............................ 2408368

[52] U.S. Cl..................................... 338/28; 29/612; 338/22 R
[51] Int. Cl.²...................................... H01C 7/00
[58] Field of Search .................. 338/28, 22, 23, 25; 29/612; 73/362 AR

[56] References Cited
UNITED STATES PATENTS

| | | |
|---|---|---|
| 1,613,877 | 1/1927 | Dyckerhoff........................ 338/28 |
| 3,296,572 | 1/1967 | Kleven.............................. 338/28 |
| 3,482,199 | 12/1969 | Curtes................................ 338/28 |
| 3,896,409 | 7/1975 | Micheli et al...................... 338/28 |

Primary Examiner—C. L. Albritton
Attorney, Agent, or Firm—Hill, Gross, Simpson, Van Santen, Steadman, Chiara & Simpson

[57] ABSTRACT

A thermistor for use as a temperature sensor for high temperatures which is sealed into a quartz tubular housing in a gas and liquid tight manner. In this construction current conductor elements are fused into the quartz housing to seal the thermistor in the housing in a fluid tight manner. Current supply lines of platinum in the form of wire or bands are connected between the thermistor and the molybdenum supply lines.

9 Claims, 2 Drawing Figures

FLUID TIGHT NTC HIGH TEMPERATURE SENSOR AND METHOD OF PRODUCING SAME

This invention relates to a gas and liquid tight NTC-high temperature sensor wherein a thermistor is disposed in a quartz housing.

Thermistor or NTC resistors are known which have a negative temperature coefficient. The resistance values decrease as the temperature to which they are exposed increases. The dependency of the resistance values on the temperature is expressed in the following function:

$$R_{T_1} = R_{T_0} \times e^{B(1/T_1 - 1/T_0)}$$

In this equation $R_T$ represents the resistance value at a temperature $T_1$, $R_{T_0}$ the resistance value at the temperature $T_0$, and B represents a material constant which is indicated in K.

SUMMARY OF THE INVENTION

An object of the present invention is to provide a fluid tight NTC-high temperature sensor wherein the thermistor is sealed off from the outside atmosphere.

Another object of the invention is to provide a fluid tight NTC-high temperature sensor comprising a quartz housing and wherein platinum current carrying lines are connected between the thermistor and molybdenum current conductors leading from the housing.

Another object of the present invention is to provide a fluid tight NTC-high temperature sensor having a thermistor disposed in a quartz housing and wherein the current conductors ae made of a metal which can be fused into the quartz material.

Other objects and advantages of the invention will become more apparent when considering the following description and reference to the accompanying drawings.

DESCRIPTION OF PREFERRED EMBODIMENT

Figure 1:
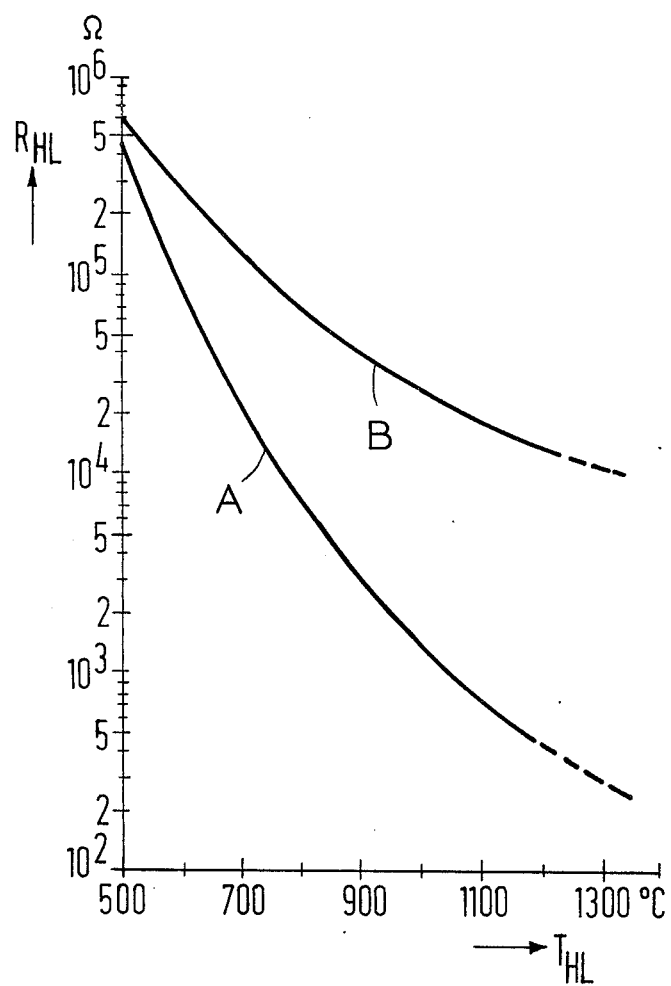
FIG. 1 is a diagram illustrating the temperature resistance characteristics of a thermistor in air and in argon.

The thermistor body consists of a metal oxide or of a mixture of various metal oxides. Of particular interest are thermistors which consist of oxides of elements which may occur in various valences. Such thermistors can be used only in an oxidizing atmosphere since during operation in reducing atmospheres the valence of the metal oxides changes and thus, the characteristic line of the thermistors is changed. Even during operation in inert atmospheres, undesirable changes of the characteristics may occur. For instance, in FIG. 1 the characteristics of the same thermistor in air (curve A) and in argon (curve B) are shown. As seen from the FIG. 1, an undesirable flattening of the temperature-resistance characteristic occurs during the operation in argon and, in addition, the resistances move toward still higher values. Considered in its entirety, this effect is undesirable since, on the one hand, a resistance ratio as great as possible is desired in the case of two different temperatures and, on the other hand, the absolute resistance value should be kept as small as possible.

Therefore, the measurement of high temperatures requires that the thermistor be disposed in oxidizing atmosphere but also that damaging enviornmental influences are kept away from it. On the one hand, these influences may be such that temperatures are to be measured in a medium which causes damage to the thermistor but on the other hand, they may also result from unforseeable pollutions of the air (e.g. changing porportions of $CO_2$ —, CO—, $H_2O$— or $SO_2$).

Therefore, as explained above, it is of advantage that the thermistor operate in a closed-in atmosphere and out of contact with certain enviornmental influences, i.e., that it be mounted in a gas and liquid-tight manner. For measuring purposes at high temperatures, it is of particular advantage to assemble the thermistor in a housing made of quartz. As current conductors or supply lines, only those of molybdenum can be considered since other metals cannot be fused into quartz in a gas and liquid-tight manner.

A disadvantageous factor is that molybdenum oxidizes at relatively low temperatures. In such a situation the atmosphere within the housing is changed since only a small supply of oxygen is in the housing, which cannot be replaced. As a result of the change of atmosphere in the housing, the characteristics of the installed thermistors change since oxygen is given off by them to the surrounding atmosphere.

It is the purpose of the present invention to provide a thermistor-temperature sensor for high temperatures which will function without above stated difficulties.

The problem is solved by the present invention by using with the NTC— high temperature sensor of the type described current supply lines of platinum which are arranged between the thermistor and the current supply lines of molybdenum.

The advantage to be achieved with this arrangement is that high temperatures can be measured without changing the resistance-temperature characteristic of the thermistor. This is due to the fact that platinum itself does not form an oxide at high temperatures and that therefore, the atmosphere within the housing does not change. The length of the housing and of the platinum supply lines preferably is designed in such a way that at those points at which the molybdenum supply lines start, only such temperatures can occur at which the molybdenum does not oxidize, that is, a maximum of 300°C.

Figure 2:
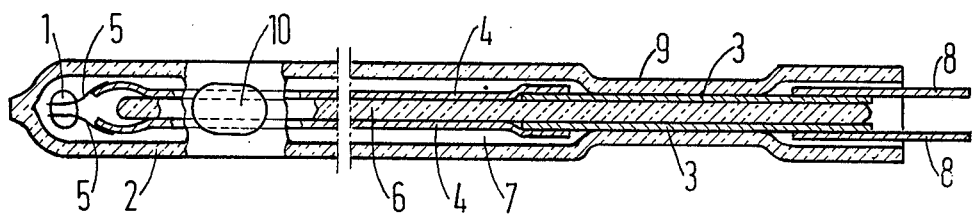
FIG. 2 is a longitudinal sectional view of an NTC-high temperature sensor embodying the invention herein.

In FIG. 2 the thermistor bead 1 is located with a quartz tube 2. Gas and liquid tight molybdenum bands 3 serving as current carrying elements are fused into the quartz tube 2. Between the molybdenum band 3 and the thermistor 1 there are disposed current carryng lines 4 made of platinum and to which the wires 5 of the thermistor are connected. A quartz carrier 6 is located between the platinum supply lines and the molybdenum supply lines, respectively, for insulation purposes against short circuits and for mechanical stabilization purposes. Within the quartz tube housing is an oxidizing atmosphere 7. The current supply lines of molybdenum 3 and platinum 4, respectively, preferably are constructed as thin bands but may also be of a wire structure. As outside current supply two wires 8 are connected to the molybdenum bands 3, which wires 8 may consist, e.g., of molybdenum as well. Support areas 9 and 10 to protect against vibrations, are arranged in the housing mutually staggered by 90°. At the area 9 the quartz housing is fused onto the wires 3 and with the quartz carrier 6 provides a gas and liquid tight seal.

The length of the quartz housing and thus also the length of the platinum feed lines depends on the temperatures whose values are to be determined. In the case of temperature sensors with which temperatures between 600° and 1200°C. are to be measured, a length of about 100 mm is sufficient, in which case the platinum feed lines are to be constructed in such a way that as little heat as possible is carried off via the platinum feed lines.

The NTC-high temperature sensors according to the invention are particularly suited for measuring exhaust gas temperatures of automobiles, for the measuring of temperatures in tempering baths in the electrochemical industry and for the control of electric ranges. These possible uses are given only be way of example and the invention is not limited thereto.

Introducing an NTC-high temperature sensor the supply wires of a thermistor are connected to one end of platinum wires or bands and to the other end of these platinum wires or bands molybdenum wires or bands are connected. Subsequently, the thermistor with the current supply lines of platinum and molybdenum are placed into a longitudinally extending quartz housing with a quartz carrier insulator disposed between the supply lines. The quartz housing is then sealed by melting that portion of the housing in the area of the molybdenum supply lines to provide a gas and liquid tight structure.

While a preferred embodiment of the invention has been disclosed, it will be appreciated that this has been shown by way of example only, and the invention is not to be limited thereto as other variations will be apparent to those skilled in the art and the invention is to be given its fullest possible interpretation within the terms of the following claims.

What is claimed is:

1. A gas and liquid tight NTC-high temperature sensor comprising:
   a quartz housing;
   a thermistor built into said quartz housing and disposed in an oxidizing atmosphere;
   molybdenum current carrying elements partially molten into said quartz housing;
   platinum current carrying elements connected between said thermistor and said molybdenum current carrying elements.

2. The NTC-high temperature sensor of claim 1 wherein
   said platinum current carrying elements are constructed as a wire.

3. The NTC-high temperature sensor of claim 1 wherein
   said platinum current carrying elements are constructed as a band.

4. The NTC-high temperature sensor of claim 1 including
   an insulator disposed between said molybdenum and platinum current carrying elements.

5. The NTC-high temperature sensor of claim 4 wherein
   said insulator comprises a quartz material.

6. The NTC-high temperature sensor of claim 1 wherein
   said thermistor comprises a metal oxide.

7. The NTC-high temperature sensor of claim 6 wherein
   said metal is a rare earth metal.

8. The NTC-high temperature sensor of claim 1 wherein
   said thermistor comprises a mixture of metal oxides.

9. The NTC-high temperature sensor of claim 8 wherein
   said metals are rare earth metals.

* * * * *